United States Patent [19]
Wright

[11] Patent Number: 5,277,478
[45] Date of Patent: Jan. 11, 1994

[54] NESTED WHEEL TRIM SYSTEM

[76] Inventor: James P. Wright, 1060 Robin La., Cookeville, Tenn. 38501

[21] Appl. No.: 909,030

[22] Filed: Jul. 6, 1992

[51] Int. Cl.⁵ .............................................. B60B 7/12
[52] U.S. Cl. .................. 301/37.37; 301/37.1; 301/108.4
[58] Field of Search ................. 301/37.1, 37.37, 108.1, 301/108.4; 206/821, 822, 499, 501; 215/10

[56]  References Cited
U.S. PATENT DOCUMENTS

| | | | |
|---|---|---|---|
| 2,652,286 | 9/1953 | Lyon | 301/37.37 |
| 3,001,826 | 9/1961 | Lyon | 301/37.37 |
| 4,240,670 | 12/1980 | Zorn et al. | 301/37.37 X |
| 4,787,681 | 11/1988 | Wang et al. | 301/37.37 |
| 4,877,151 | 10/1989 | Rush et al. | 206/499 X |
| 4,895,415 | 1/1990 | Stay et al. | 301/37.37 |
| 5,031,965 | 7/1991 | Buerger | 301/37.37 |
| 5,181,767 | 1/1993 | Hudgins et al. | 301/37.37 |

Primary Examiner—Russell D. Stormer
Attorney, Agent, or Firm—Edward D. Lanquist, Jr.; Mark J. Patterson; I. C. Waddey, Jr.

[57] ABSTRACT

In the present invention, a nested wheel trim system is provided. The system provides two wheel trim attachments each having a trim member, a hub cover, and a jam nut. The two trim members are sized so as to nest into each other, and the hub covers are also sized to nest within one another so that the nested hub covers can be placed on top of the trim members if the trim members are for deep well wheels or under the trim members for regular well wheels.

9 Claims, 7 Drawing Sheets

NESTED WHEEL TRIM SYSTEM

BACKGROUND OF THE INVENTION

The present invention relates generally to an attachment for decorative wheel trim members to motor vehicle wheels and more particularly to a wheel trim attachment system which can be nested for easy packing.

It will be appreciated by those skilled in the art that many owners of trucks and recreational vehicles use wheel trim members to improve the cosmetic appearance of their wheels by adding decorative trim rings and the like. The same wheel trim attachment systems are used for heavy trucks. Unfortunately, the Department of Transportation requires that these trim members be removable to allow easy inspection of the axle. Also, many manufacturers require that OEM wheel trim members be attachable to a wheel without removal of the existing lug nuts. It will be further appreciated by those skilled in the art that given the requirements by the Department of Transportation and many motor vehicle manufacturers, that the state of the art wheel trim attachment systems are very bulky and take up much room during shipping thereby greatly increasing the cost of shipping the product.

What is needed, then, is a wheel trim attachment system which can be attached to a wheel without removal of the existing lug nuts. This needed system must be inspectable by the Department of Transportation without removing the existing lug nuts. This needed wheel trim attachment system must be shaped in a size so as to be easily nested so that it takes up the least amount of room during packaging.

SUMMARY OF THE INVENTION

In the present invention, a nested wheel trim system is provided. The system provides two wheel trim attachments each having a trim member, a hub cover, and a jam nut. The two trim members are sized so as to nest into each other, and the hub covers are also sized to nest within one another so that the nested hub covers can be placed on top of the trim members if the trim members are for deep well wheels or under the trim members for regular well wheels.

Accordingly, one object of the present invention is to provide a wheel trim attachment system for heavy duty vehicles.

Still another object of the present invention is to provide a wheel trim attachment system which can be attached to a standard wheel without removal of existing lug nuts.

Still a further object of the present invention is to provide a wheel trim attachment system which allows for the Department of Transportation inspection of the axil without removal of the existing lug nuts.

A still further object of the present invention is to provide a wheel trim attachment system which allows easy nesting for easy packing and shipping.

DESCRIPTION OF THE PREFERRED EMBODIMENT

Figure 1:
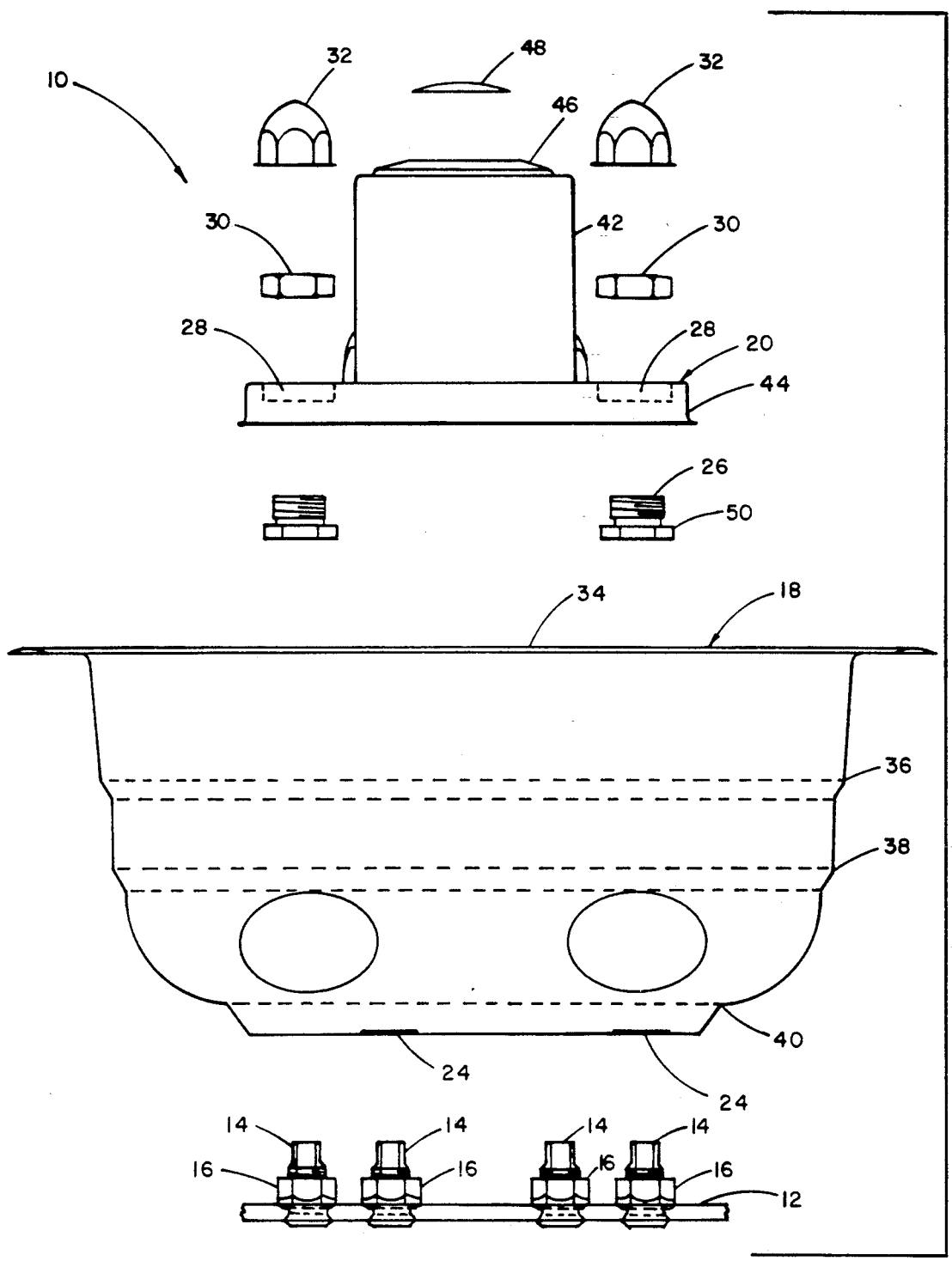
FIG. 1 is an exploded view of the nested wheel trim system of the present invention as used on a rear or deep well wheel.

Referring now to FIG. 1 there is shown generally at 10 the nested wheel trim system of the present invention. System 10 attaches to wheel 12 having lugs 14 which are received by lug nuts 16. System 10 has trim member 18 having holes 24 which receive existing lug nuts 16. In the preferred embodiment, stud extenders 26 are placed over existing studs 14 to attach trim member 18 to wheel 12. Hub cover 20 has orifice 28 which receive either stud extenders 26 or existing studs 14 if existing studs 14 are long enough to pass through holes 24 and through orifice 28. Jam nuts 30 are used to secure hub cover 20 to stud extenders 26 or existing studs 14. Lug nut covers 32 frrictionally fit over and are used to cover jam nuts 30. Trim member 18 has rim 34, diameter 36, diameter 38, and diameter 40. Hub cover 20 has axle cover 42, ridge 44, and crown 46. Ridge 46 can have removable cap 48 which fractionally secures to crown 46. Stud extenders 26 have basal mounting plate 50 which contacts trim member 18 proximate to holes 24. Trim member 18 shown in FIG. 1 is intended for a rear wheel having an axle usually in the manner of a dual rear wheel.

Figure 2:
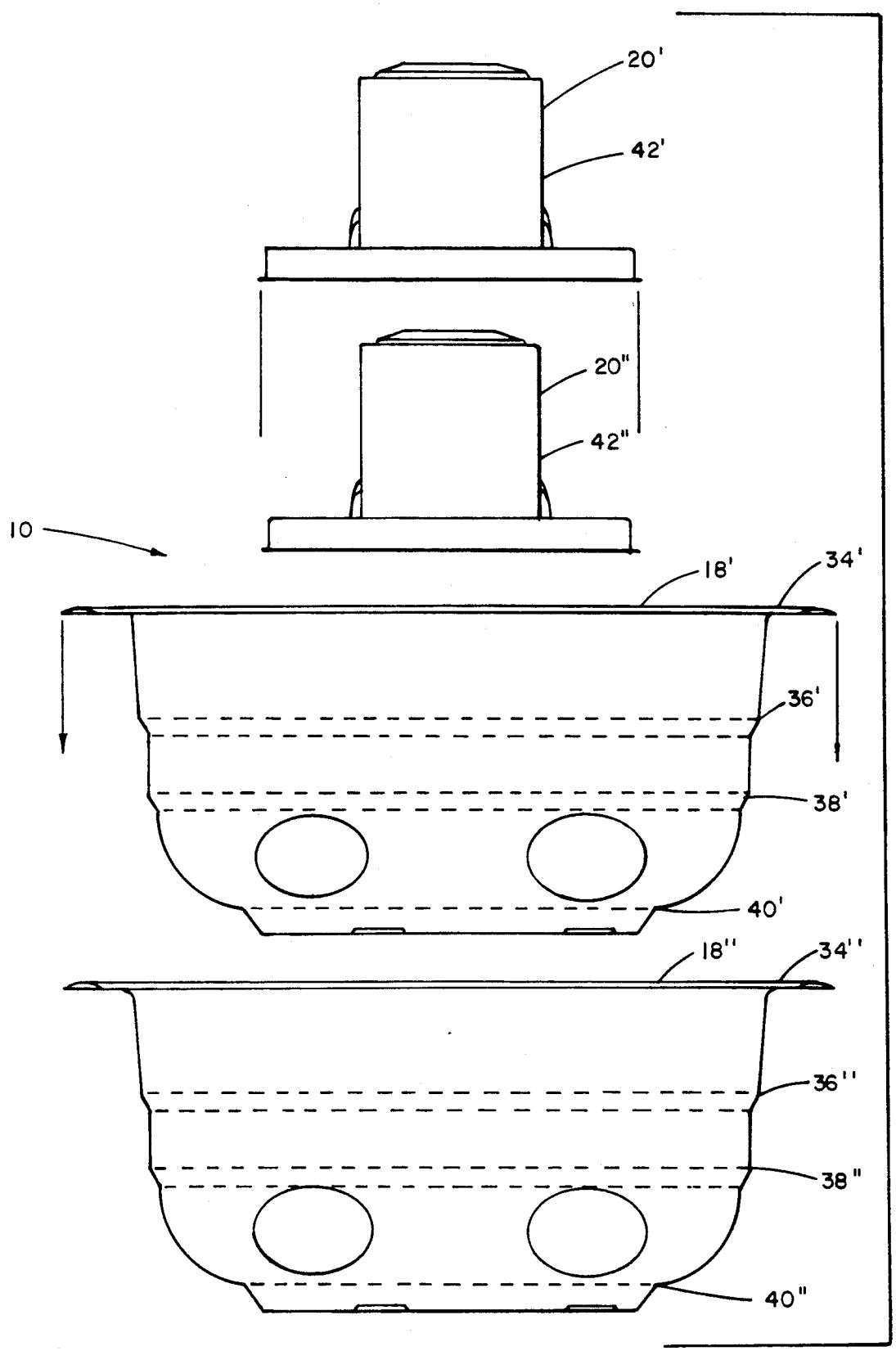
FIG. 2 is an exploded view of the nesting of two wheel trim attachments for a rear or deep well wheel.

Referring now to FIG. 2 there is shown generally at 10 the nested wheel trim system for use with a dual rear wheel. First trim member 18' nests into second trim member 18". Second hub cover 20" rests into first trim member. First hub cover 20 ' nests over second hub cover 20". The diameter of first hub cover 20" is sized to be just larger than the diameter of second hub cover 20" so that first axle cover 42' can fit over second axle cover 22". Similarly, first trim member 18' is sized to fit within second trim member 18" so that first trim member rim 34' and first trim member diameters 36', 38', and 40' are just smaller than second trim member ring 34" and second diameters 36", 38", and 40". Therefore, first trim member rim 34' lies proximate to second diameter 36' and diameter 36' lies to the inside and proximate to second diameter 38".

Figure 3:
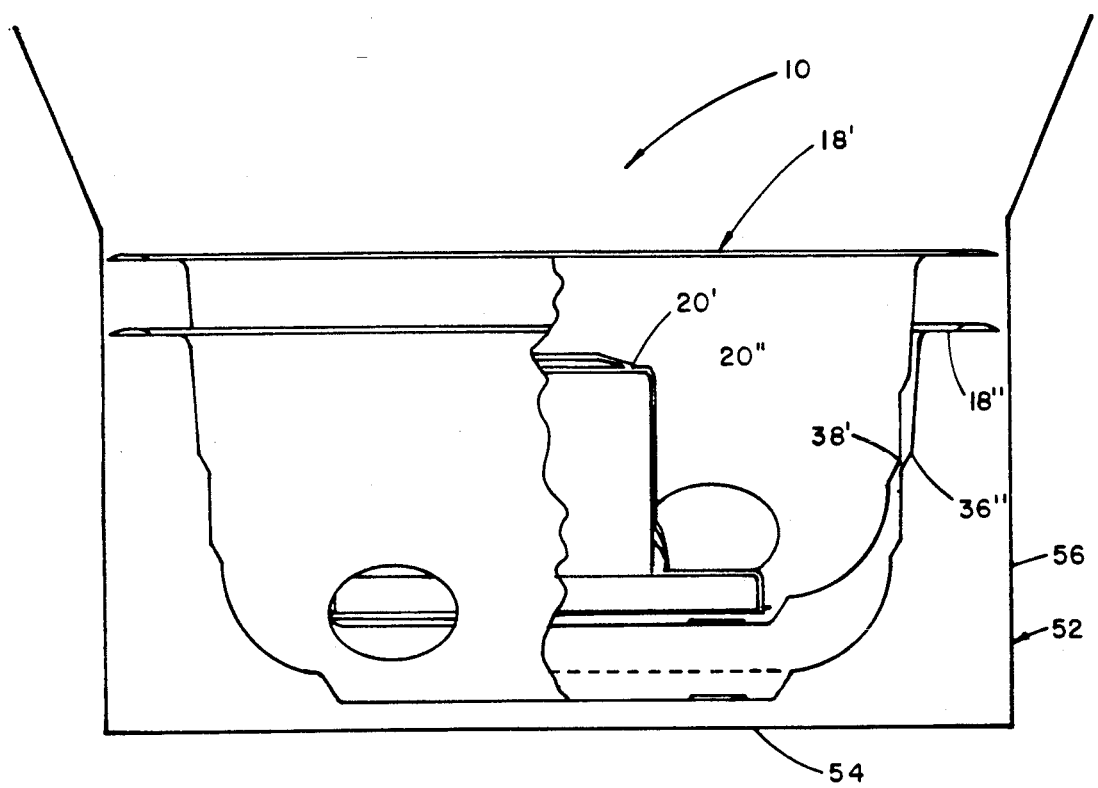
FIG. 3 is a side cut-away view showing the nesting of two wheel trim attachment for rear or deep well wheels.

Referring now to FIG. 3 there is shown generally at 10 another view of the nested wheel trim system of the present invention. As can be seen here, first diameter 38' resides proximate to second diameter 36" when first trim member 18' nests into second trim member 18". After that, hub covers 20" and 22' reside within well of first trim member 18'. This system 10 is then fitted into box 52 having bottom 54 and sides 56 thereby allowing sides 56 to be shallower than the systems of the prior art.

Figure 4:
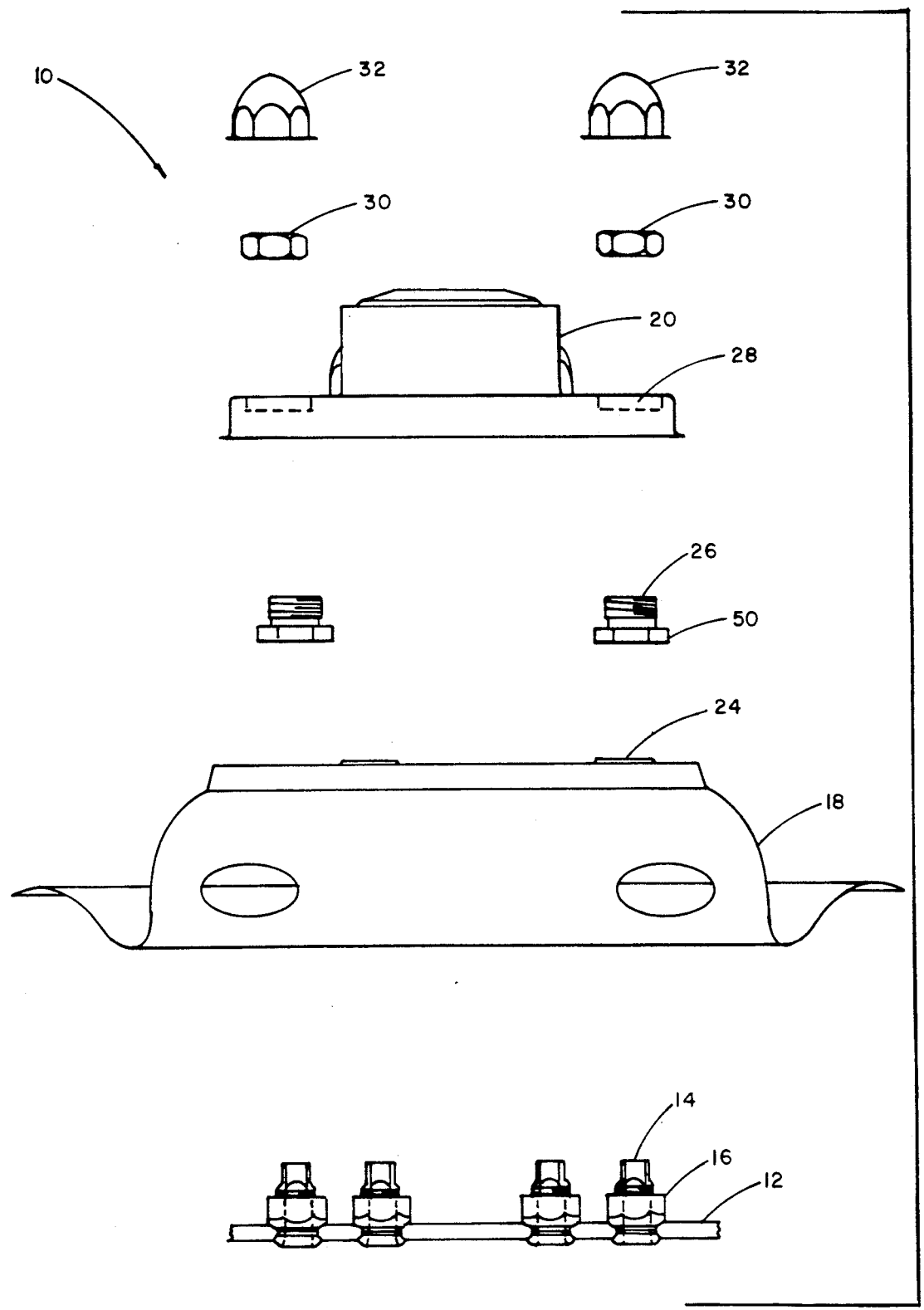
FIG. 4 is an exploded view of the nested wheel trim system of the present invention as used on a front or shallow well wheel.

Referring now FIG. 4 there is shown generally at 10 still another embodiment of the nested wheel trim system of the present invention. In this instance, wheel 12 is a shallow wheel which usually is a front wheel which does not have the deep axle and the deep well. In this instance, wheel 12 has existing studs 14 and existing nuts 46. Trim member 18 has holes 24 which receive existing studs 14. In the preferred embodiment, stud extender 26 having basal mounting plate 50 is used to hold trim member 18 to wheel 12. Hub cover 20 having orifice 28 is then placed such that orifice 28 receive stud extender 26. Jam nuts 30 are then used to secure hub cover 20 to trim member 18. Lug nut covers 32 then fictionally attach to jam nuts 30 to cover jam nuts 30.

Figure 5:
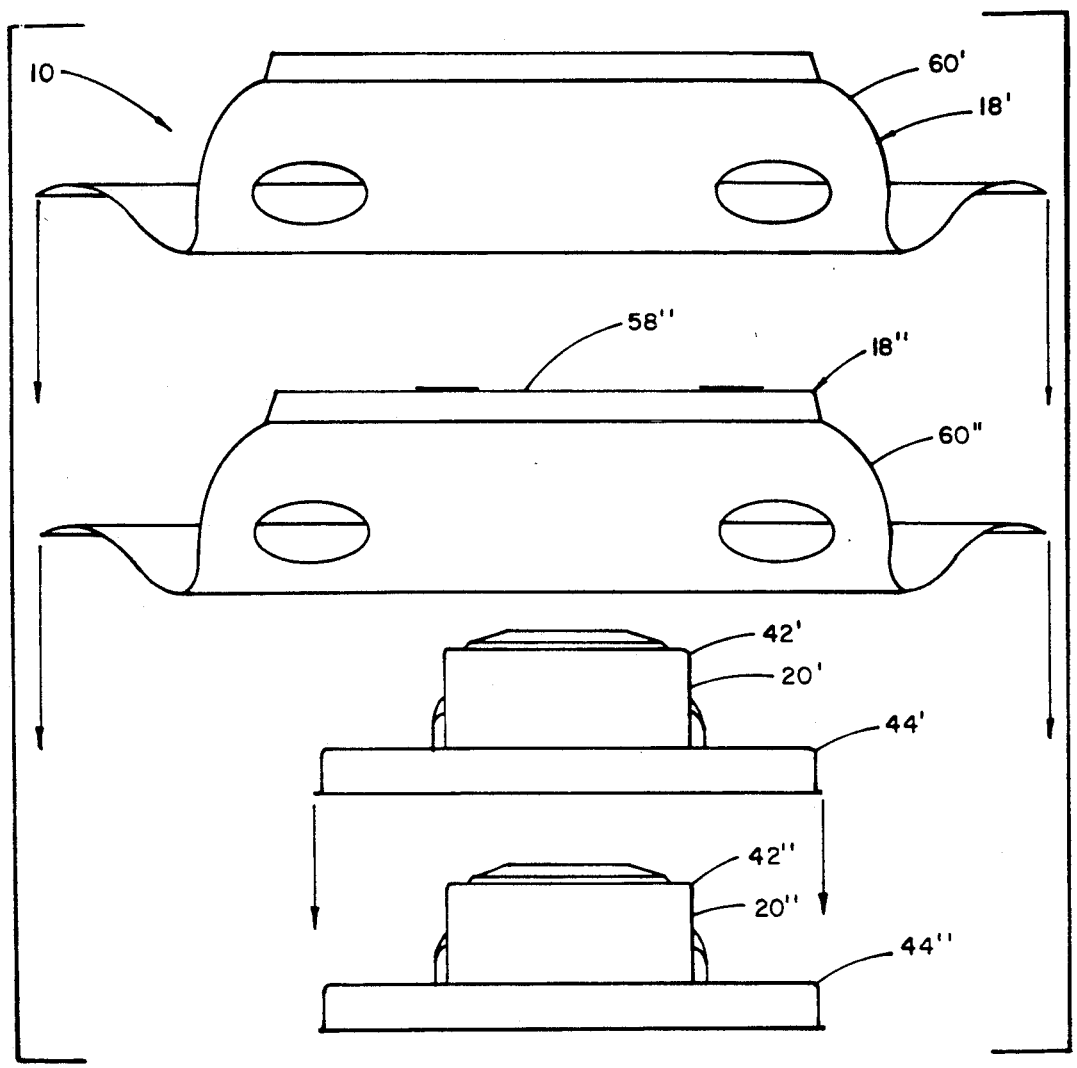
FIG. 5 is an exploded view showing the nesting of two wheel trim attachments used with a front or shallow well wheel.

Referring now to FIG. 5 there is shown generally at 10 the nested wheel trim system as used with a front or shallow well wheel. In this instance, second hub cover 20" nests into first hub cover 20". This is achieved because first ridge 44' has an inside diameter slightly larger than second ridge 44". Similarly, inner diameter of axle cover 42' is slightly larger than outer diameter of axle cover 42". Second trim member 18" has opening 58 which allows for inspection. Opening 58" receives first hub cover 20'. Second diameter 60" is slightly smaller than first diameter 60' thereby allowing first trim member 18' to nest over second trim member 18".

Figure 6:
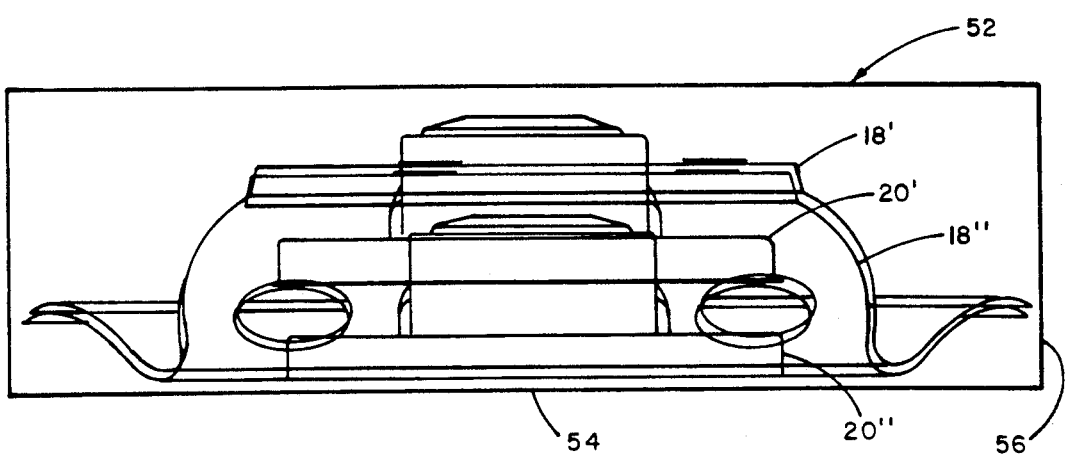
FIG. 6 is a side cut-away view showing the nesting of two wheel trim attachments used in connection with a front or shallow well wheel.

Referring now to FIG. 6 there is shown generally at 10 the nested wheel trim system of the present invention as used with a front wheel or shallow well wheel in box 52 having bottom 54 and side 56. FIG. 6 demonstrates that first hub cover 20" nests over second hub cover 22'. Second trim member 18" nests over first hub cover 20'. First trim member 18' nests over second trim member 18" thereby allowing side 56 to be very short.

Figure 7A:
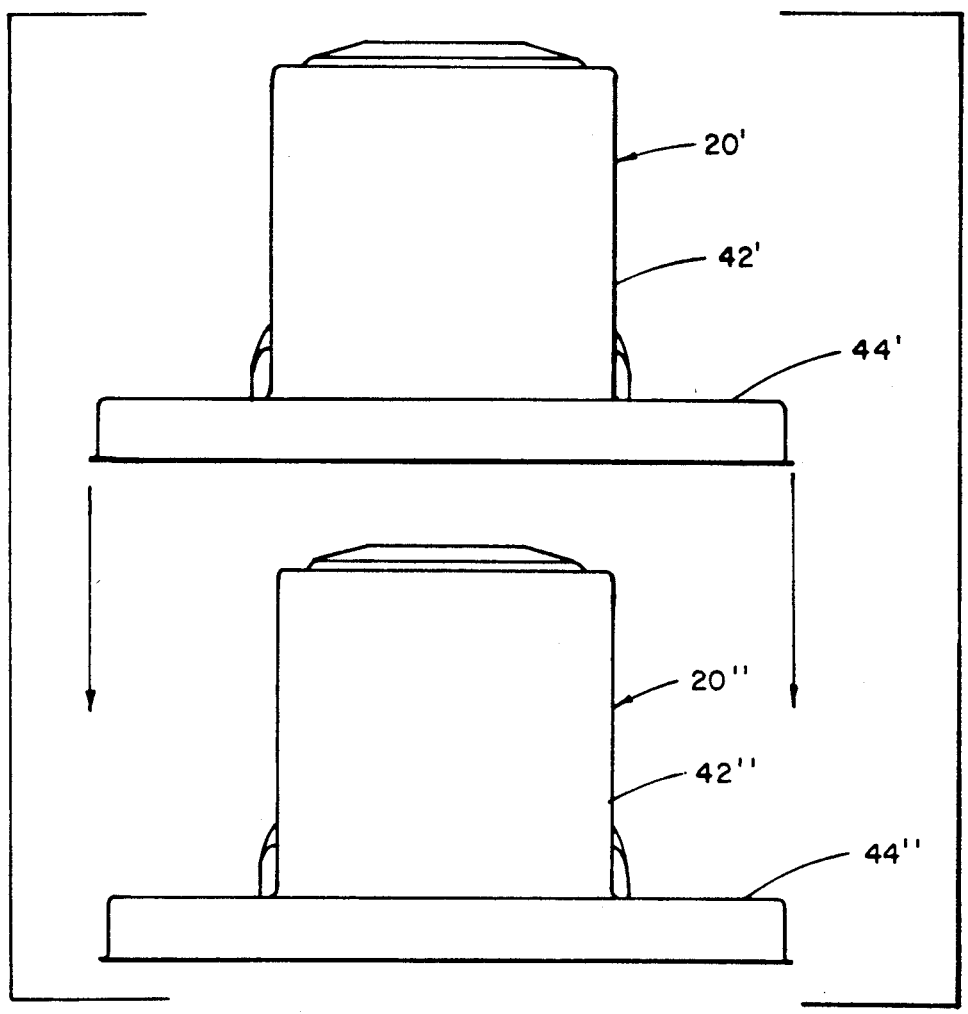
FIGS. 7a and 7b are side views showing the nesting of two hub covers.
Figure 7B:
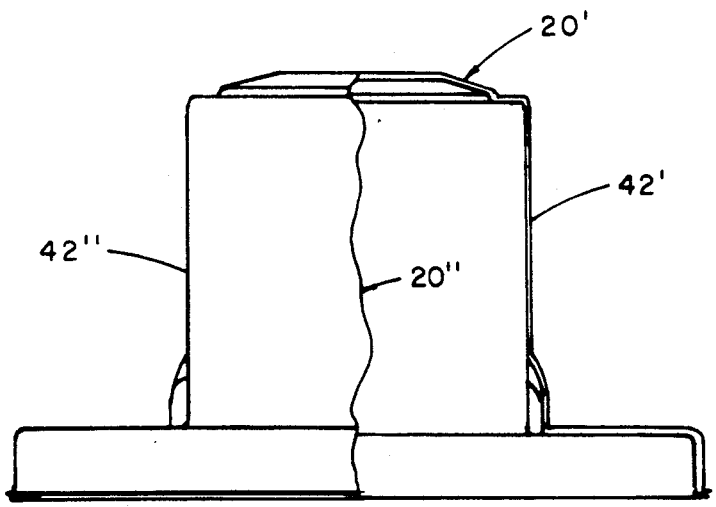

Referring now to FIGS. 7a and 7b there is shown how first hub cover 20' nests with second hub cover 20" as discussed above. First axle cover 42' has an inner diameter which is slightly larger than outer diameter of second axle cover 42". Similarly, inner diameter of first ridge 44' can be greater than inner diameter of second ridge 44" so that first ridge 44' nests over second ridge 44".

Referring now to FIGS. 1-7, one can see how nested wheel trim system 10 can be used to nest both front and rear wheels together. Using the nesting of the front or shallow wheel shown in FIGS. 4-6 can be placed on top of the nested rear wheel system shown in FIGS. 1-3.

In the preferred embodiment, outer diameter of second axle cover 42" is substantially 5.582 inches with inner diameter of first axle cover 42' being substantially 5.7 inches. In the preferred embodiment, 3 millimeters is provides as the difference between the inner diameter of the upper nested piece and the outer diameter of the lower nested piece.

Figure 8A:
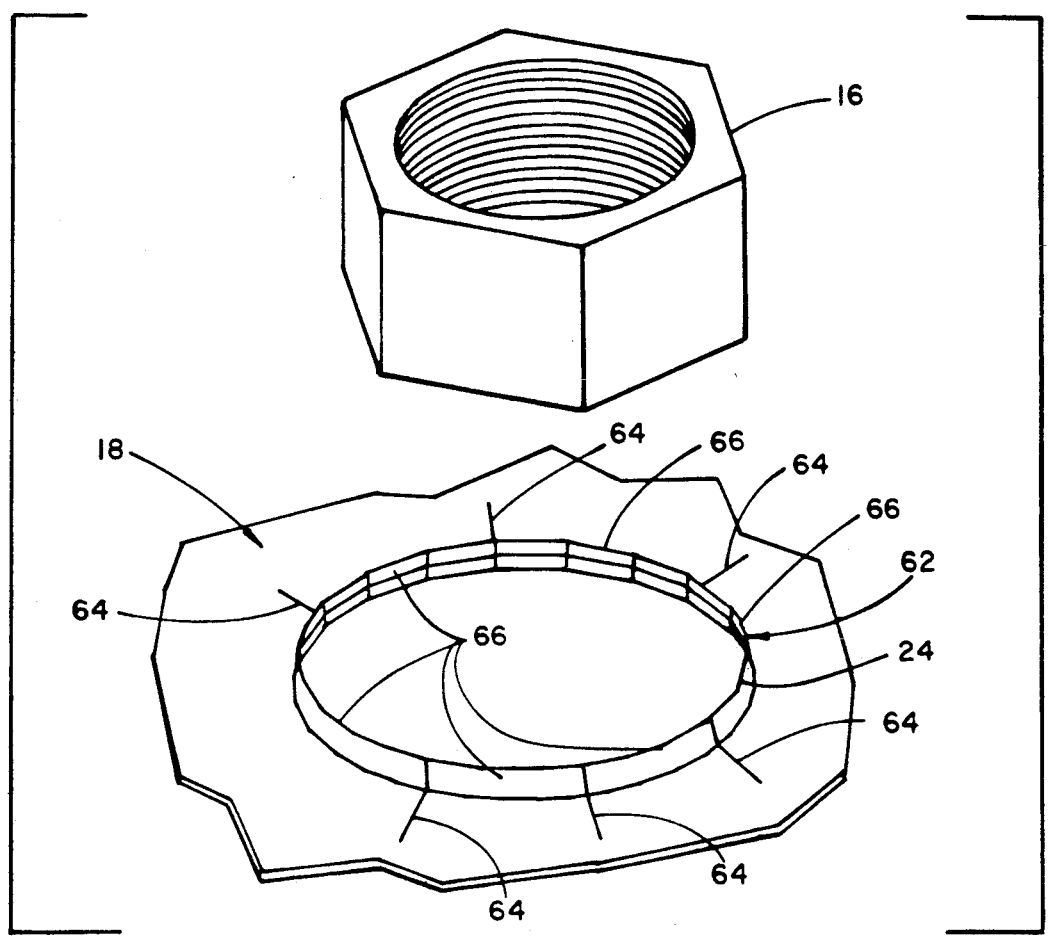
FIGS. 8a and 8b are prospective cut-away view showing the reverse draw of the present invention.
Figure 8B:
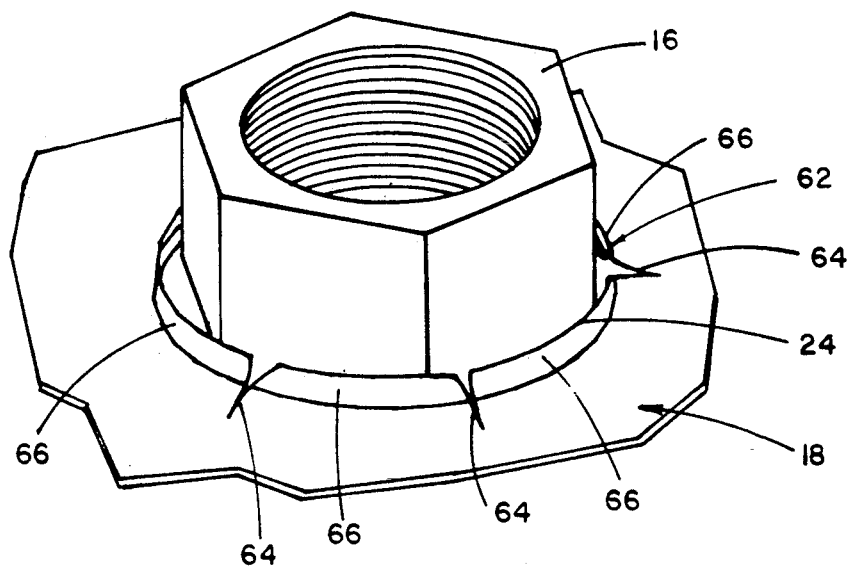

Referring now to FIGS. 8a and 8b there is shown generally at 62 the reverse draw of the present invention. Trim member 18 has holes 24 as described above. However, reverse draw 62 is provided which allows seating of existing lug nuts 16. Cuts 64 are placed into member 18 to create fingers 66. Six fingers 66 are used in the preferred embodiment. Reverse draw 62 frictionally fits and centers about lug nut 16. If lug nut is larger than reverse draw 62, fingers 66 expand to fit.

Thus, although there have been described particular embodiments of the present invention of a new and useful nested wheel trim system, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What I claim is:

1. A nestable wheel trim system for attachment to a first and a second wheel of a vehicle, each of said wheels having two wheel studs received by two lug nuts, said system comprising:
   a. a first wheel trim attachment attachable to said first wheel, said first wheel trim attachment having a first wheel trim member and a first hub cover, said first wheel trim member having a first diameter, a second diameter, and a third diameter, said wheel trim member having a first diameter, a second diameter smaller than said first diameter, and a third diameter smaller than said second diameter;
   b. a second wheel trim attachment attachable to said second wheel, said second wheel trim attachment having a second wheel trim member and a second hub cover, said second wheel trim member having a fourth diameter, a fifth diameter, and a sixth diameter, said second wheel trim member having a fourth diameter larger than said first diameter, a fifth diameter smaller than said fourth diameter and larger than said second diameter, and a sixth diameter smaller than said fifth diameter and larger than said third diameter;
   c. said first wheel trim attachment nestable with said second trim attachment, such that said first diameter contacts said fourth diameter, said second diameter contacts said fifth diameter, and said third diameter contacts said sixth diameter.

2. The system of claim 1 wherein:
   a. said first hub cover nestable over said second hub cover;
   b. said second trim member larger than said first hub cover and nestable over said first hub cover; and
   c. said first trim member nestable over said second trim member.

3. The system of claim 1 wherein:
   a. said first trim member nestable over said second trim member
   b. said second hub cover nestable over said first trim member; and
   c. said first hub cover nestable over said second hub cover;

4. The system of claim 2 further comprising:
   a. plural jam nuts;
   b. said first wheel trim having a hole to receive each of said wheel studs, said first hub cover having an orifice to receive each of said lug nuts of said first wheel, and one of said jam nuts to receive each of said studs to hold said first trim member and said first axle cover to said first wheel; and
   b. said second wheel trim having a hole to receive each of said wheel studs, said second hub cover having an orifice to receive each of said lug nuts of said second wheel, and one of said jam nuts to receive each of said studs to hold said second trim member and said second axle cover to said second wheel.

5. A nestable wheel trim system for attachment to a first and a second wheel of a vehicle, each of said wheels having two wheel studs received by two lug nuts, said system comprising:

a. a first wheel trim attachment attachable to either of said first wheel or said second wheel, said first wheel trim attachment having a first wheel trim member, a first hub cover, and two jam nuts, said first wheel trim member having a hole to receive each of said wheel studs, said first hub cover having an orifice to receive each of said lug nuts of said first wheel, and a jam nut to receive each of said studs to hold said first trim member and said first axle cover to said first wheel;

b. a second wheel trim attachment attachable to either of said first wheel or said second wheel, said second wheel trim attachment having a second wheel trim member, a second hub cover, and two jam nuts, said second wheel trim member having a hole to receive each of said wheel studs, said second hub cover having an orifice to receive each of said lug nuts of said second wheel, and a jam nut to receive each of said studs to hold said second trim member and said second axle cover to said second wheel; and wherein said first wheel trim attachment is smaller than said second wheel trim attachment and said first hub cover is smaller than said second hub cover;

c. said first wheel trim attachment nestable with said second wheel trim attachment such that said first hub cover rests within said second hub cover.

6. The system of claim 5 wherein:

a. said first hub cover nestable over said second hub cover;

b. said second trim member nestable over said first hub cover; and c. said first trim member nestable over said second trim member.

7. The system of claim 5 wherein:

a. said first trim member nestable over said second trim member b. said second hub cover nestable over said first trim member; and c. said first hub cover nestable over said second hub cover;

8. A nestable wheel trim system for attachment to a first and a second wheel of a vehicle, each of said wheels having two wheel studs received by two lug nuts, said system comprising:

a. a first wheel trim attachment attachable to said first wheel, said first wheel trim attachment having a first wheel trim member, a first hub cover, two first stud extenders, and two jam nuts, said first wheel trim member having a hole to receive each of said wheel studs, said first stud extenders receive said studs to hold said first trim member to said wheel, said first hub cover having an orifice to receive each of said first stud extenders, and a jam nut to receive each of said first stud extenders to hold said first trim member and said first axle cover to said first wheel, said wheel trim member having a first diameter, a second diameter smaller than said first diameter, and a third diameter smaller than said second diameter;

b. a second wheel trim attachment attachable to said second wheel, said second wheel trim attachment having a second wheel trim member, a second hub cover, two second stud extenders, and two jam nuts, said second wheel trim member having a hole to receive each of said wheel studs, said second stud extenders receiving said studs to attach said second trim member to said second wheel, said second hub cover having an orifice to receive each of said second stud extenders, and a jam nut to receive each of said second stud extenders to hold said second trim member and said second axle cover to said second wheel, said second wheel trim member having a fourth diameter larger than said first diameter, a fifth diameter smaller than said fourth diameter and larger than said second diameter, and a sixth diameter smaller than said fifth diameter and larger than said third diameter; and c. said first wheel trim attachment nestable with said second wheel trim attachment such that said first diameter rests upon said fourth diameter, said second diameter rests upon said fifth diameter, and said third diameter rests upon said sixth diameter.

9. The system of claim 8 wherein said holes are reverse drawn.

* * * * *